Feb. 13, 1934.    J. E. SMITH    1,947,232
COOKING APPLIANCE
Filed Jan. 13, 1932

INVENTOR
John E. Smith
BY HIS ATTORNEY

Patented Feb. 13, 1934

1,947,232

UNITED STATES PATENT OFFICE 1,947,232

COOKING APPLIANCE

John E. Smith, Belleville, Ill., assignor to Knapp-Monarch Company, Belleville, Ill., a corporation of Missouri Application January 13, 1932. Serial No. 586,339

22 Claims. (Cl. 219—43)

My invention relates to cooking apparatus and more particularly to such apparatus wherein it is intended to stop the cooking after a predetermined time.

My invention is shown as applied to a device for cooking eggs, but the principles therein contained are obviously applicable to other appliances.

One object of my invention is to provide in cooking apparatus of the above character an arrangement whereby the supply of current will be automatically cut off after a predetermined time, and also wherein the apparatus is ventilated so as to stop the cooking action. This ventilation can be accomplished in several different ways—either by uncovering openings or by raising the cover.

It is another object of my invention to provide a switch arrangement for controlling the energization of the heating element, which switch is either closed directly, or released so that it may be closed by hand, when the cover of the apparatus is secured in closed position.

It is a further object of my invention to provide a mounting for a control thermostat that insures cooling of the thermostat at the beginning of each cooking operation. The thermostat may be adjustable for various periods of cooking, and is arranged to have a free area of movement after the completion of the thermostat operation that results in stopping the cooking action.

It is an even further object of my invention to provide in apparatus of the above indicated character a food carrier having an insulated handle, and also that carries means for actuating the control switch.

It is a still further object of my invention to provide an arrangement for mounting the bowl upon a base in a manner so that the base does not heat up unduly to a point where it would be too warm to handle with comfort.

Other and further objects of my invention will be apparent from the following specification taken in conjunction with the accompanying drawing, wherein—

Figures 1, 2, 3, 4:
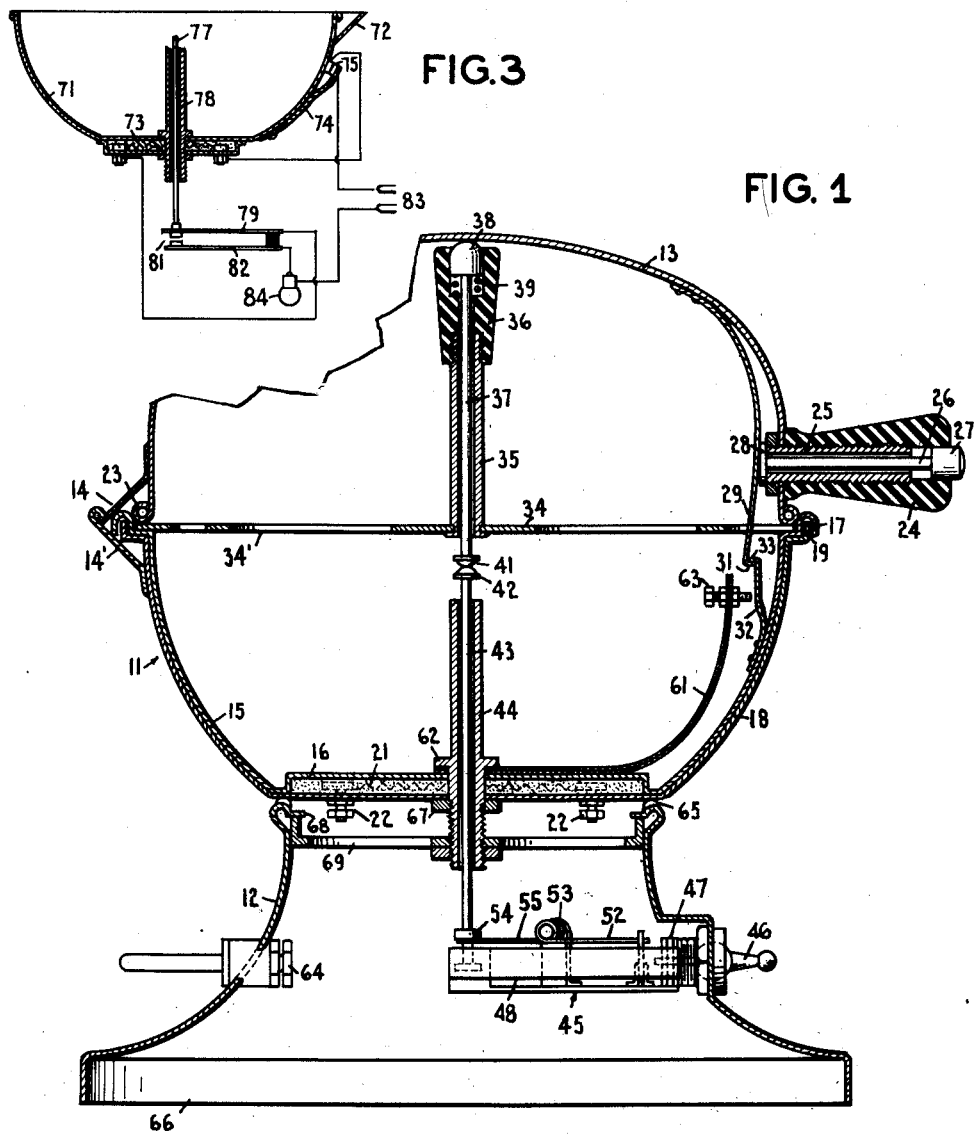
Figure 1 is a vertical sectional view of an egg cooker in which the principles of my invention are embodied.
Fig. 2 is a detail showing a plan view of the switch of Fig. 1 and its operating mechanism.
Fig. 3 is a partial view partly in section and partly diagrammatic showing of a modified form of apparatus.
Fig. 4 is a partial view partly in section showing a still further modified form of apparatus.

Referring to the forms shown in Figs. 1 and 2, the apparatus comprises a bowl 11 mounted upon a base 12 and having a cover 13 hingedly connected thereto as indicated at 14. A spring 14' cooperates with the hinge and tends to open the cover 13.

The bowl 11 consists of two members, an inner bowl 15 and an outer bowl 18. The inner bowl has at the base thereof a cavity formed by the raised portion 16, and an upper lipped rim 17. The outer bowl has an upstanding flanged rim 19 that is inserted in the lip 17. As will be seen from Fig. 1, the two bowls 15 and 18 are nested in each other and contact with each other throughout the entire areas thereof, except for the cavity 16 which is closed by the bottom bowl 18. The cavity 16, which projects inwardly of the bowl 11, receives and entirely encloses a heating element 21 that has a pair of terminals 22 projecting from the bottom thereof and extending through the bottom bowl 18 and to which the electrical connections are made.

The cover 13 has a beaded rim 23 which nests within the rim 17 when the cover is closed. The cover 13 is also provided with an insulated hollow handle 24 which is screwed upon a hollow bolt 25. A plunger 26 extends through the handle 24 and bolt 25, and has a head 27 projecting beyond the handle, and at the opposite end a disc 28. The disc 28 engages a catch 29, composed of a leaf spring, the free end of which is bent over as indicated at 31. The catch 29 cooperates with a leaf spring keeper or latch 32, the free end of which is bent over as indicated at 33, the ends 31 and 33 engaging with each other when the cover is in closed position so as to lock the same closed. By pressing upon the head 27 of the plunger 26 the cover may be unlocked and released by hand.

Mounted within the device is the egg or food carrier which consists of a plate 34 having egg receiving apertures 34'. The plate rests upon the shoulder of the rim 17 and has a central upstanding sleeve 35 which is hollow and screw threaded at its upper end to receive a hollow insulated handle 36. Extending through the handle and tube is a rod 37 the head of which extends above the top of the handle 36, as indicated at 38. The head engages a coiled spring 39 which is mounted in the handle 36 and which spring tends to maintain the rod 37 lifted. At its lower end the rod 37 has a foot 41 which engages a head 42 of a second rod 43 that extends through a tubular guide 44 and engages at its lower end the switch mechanism indicated generally at 45.

The switch 45 may be of any ordinary variety, here shown as a snap switch, but the details of which are not shown except for the operating lever 46 that projects outside of the base 12. The lever 46, in addition to opening and closing the switch contacts (not shown) also moves a bar 47 laterally against the tension of a spring 48. Cooperating with the spring 48 is a notched detent 49, the spring 48 engaging the notch in one position of the detent. The detent is normally lifted by means of the spring 51. At its opposite end the detent 49 is engaged and depressed by one leg 52 of a coiled spring 53 when that spring is put under tension. Spring 53 is put under tension by a downward movement of the rod 43 which has at its lower end a collar 54 that engages the other leg 55 of the spring 53.

When the rod 43 is pressed, the tension on the coiled spring 53 is increased which increases the tension on the leg 52 thereof to overcome the upward push of the spring 51 upon the detent. When the parts are in this position and the lever 46 is thereafter moved to the "on" position, where the contacts are closed, the bar 47 is moved out to move the spring 48 past the notch of the detent 49, allowing the detent to fall, and thus the spring 48 is held out of action and the switch remains in the "on" position. Otherwise, the detent 49 would be maintained lifted by the spring 51, and the spring 48 would then be free to push upon the bar 47 to return the lever 46 to "off" position.

This switch action is co-related with mechanism to assure that the cover 13 is closed and therefore the apparatus ready to cook before the switch 45 may be set in the "on" position to energize the heating element 21. This is accomplished by aligning the rods 37 and 43 and extending the head 38 of the rod 37 high enough so that it must be engaged by the cover 13 and pushed down sufficiently to allow the switch 46 to operate when the cover is lowered into the position shown in Fig. 1, where it is locked closed. Reversely, when the cover 13 is opened, the rod 37 is lifted by the spring 39, and the rod 43 is lifted by the leg 55 of the spring 53, which relieves the tension upon the leg 52 so that the detent 49 is free to be lifted by the spring 51, whereupon the spring 48 immediately moves the bar 47 inwardly to trip the switch lever 46 and open the crcuit through the switch 45.

I have arranged to release the cover automatically after a predetermined time interval to thereby effect this cycle of switch action automatically. In the case of the egg cooker of Fig. 1, this releasing of the cover will cause the same to open up and thereby the cooking of the eggs will be stopped because of the large circulation of air about the eggs in the holder. In any event, the opening of the cover de-energizes the heating element and the cooking is stopped in this manner.

This automatic action is obtained by the operation of the thermostat 61. In the form shown in Fig. 1, the thermostat is secured at one end under the shoulder 62 on the tubular guide 44 so that the thermostat lies along the bottom of the vessel and directly in contact with the raised portion 16 where the heating element is housed. The free end of the thermostat 61 extends upwardly terminating in the vicinity of the latch 32. However, it will be noted that the thermostat (which is shown in its inactive position) is spaced a considerable distance from the wall of the bowl 11 and also is spaced from the catch 32. At its upper end the thermostat has adjustably mounted therein a screw 63. The screw 63 is arranged so that when the thermostat 61 moves toward the latch 32 (as it will do when heated), the end of the screw 63 will engage the latch 32, and further movement of the thermostat will move the latch.

The operation of the cooker of Fig. 1 is substantially as follows:

The heating element 21 is designed to evaporate a teaspoonful of water per minute. In this way the cooking period for the eggs is determined. It will be assumed that it is desired to cook the eggs that are placed in the holder 34 for a period of three minutes. To this end three teaspoonsful of water are deposited in the bowl 11. This water covers the cavity 16 containing the heating element 21 and a portion of the thermostat 61. The holder 34 is then placed in position in the bowl and the eggs placed in the apertures 34'. The cover is closed until the catch 29 engages under the latch 32 which operation of the cover places the detent 49 under tension as explained above, so that when the switch lever 46 is then moved to "on" position the switch will remain in that position. After a period of three minutes the water in the bowl 11 will be evaporated, whereupon the heat of heating element 21 will be transmitted to the inner bowl 15 which will rapidly heat up the thermostat 61 and cause it to move in the direction of the latch 32. The screw 63 will engage the latch 32 and the further movement of the thermostat 61 will push the latch 32 toward the wall of the bowl until the catch 29 is cleared, whereupon the hinge spring 14' will cause the cover to open a considerable distance. The important thing about the opening of the cover is that it shall not open to a point where water produced by the condensation of the steam on the inside of the cover can drip outside of the bowl, or if the cover opens 90°, the cover should be of such construction to prevent this happening.

As soon as the cover 13 has been released, pressure is lifted from the top of the rod 37, which is raised by the spring 39, and also from the top of the rod 43, which is then raised by the spring 53, so that pressure is taken off the top of the detent 49 and its spring 51 is free to lift it out of the way so that the spring 48 will move the bar 49 to trip the switch lever 46 to cut off the current to the heating element. (The electrical connections between the external terminal pins 64, the heating element terminals 22 and the switch 45 have been omitted for the sake of clarity of the showing, and since there is nothing unusual therein.)

Thus, the automatic releasing of the cover 13 cuts off the supply of energy to the heating element 21; it stops the cooking of the eggs because when the cover is opened the eggs become exposed to the considerably cooler atmosphere; and the opening of the cover becomes a visual indicator to the user that the cooking action is completed.

As a matter of structural detail, which is desirable in the proper functioning of the form shown in Fig. 1, it is noted that the latch 32 is spaced a considerable distance from the wall of the inner bowl 15. This is done not only so that the latch 32 may be moved a sufficient distance to release the cover as just explained, but there is an additional distance provided in which the latch 32 is free to continue to move under the influence of the thermostat 61 during the interval between the opening of the cover and the cooling of the thermostat 61 sufficiently to contract it toward its normal position, shown in Fig. 1.

If it should be desired to immediately cook a second batch of eggs, the cooked eggs are removed from the holder 34. A fresh quantity of water, one, two, three or four teaspoonsful, depending upon the period of cooking desired, is placed in the bowl 11. This water will cover the heating element cavity and immediately cool the thermostat 61 so as to retract it sufficiently that the latch 32 is returned to a position to be engaged by the catch 29 when the cover is closed. The eggs to be cooked are placed in the holder 34, positioned in the bowl, and the above described cycle of operations is again gone through with, the cover again opening automatically when the water in the bowl 11 is evaporated.

The terminal pins 64, to which the usual type of connector plug is attached, and the switch 45 are mounted in the base 12. The rim of this base is provided with three or four knobs or projections 65. When the bowl 11 is assembled upon the base 12, the bowl rests upon these projections. The space in between the projections is unobstructed so that the interior of the base 12 is ventilated and kept cool. This may be aided by the addition of openings 66 at the bottom of the base. This matter of cooling the base 12 is desirable because the bowl 11 may get too hot for the human touch.

In the assembly of the apparatus, the inner and outer bowls 15 and 18 are held together by means of the nut 67 which screws upon the lower threaded edge of the tubular guide 44 and draws the bowls together and about the heating element, and against the shoulder 62. The rim of the base has an inwardly extending flange 68 which is engaged by a spider 69 that also screws upon the lower end of the tubular guide 44, thus rigidly clamping the base and bowl together.

In the form shown in Fig. 1, there is provided a heating element which is enclosed so as to be free from corrosion but that nevertheless is inside of the bowl 11, as is the thermostat 61. The purposes and reasons for this arrangement have been explained. However, it is entirely practical to arrange the heating element and the thermostat outside of the bowl and also to vary other details. Some of these are indicated in Fig. 3 by way of example, where the bowl 71 is composed of a single shell having near its rim and on one side a mouth 72. At the bottom of the bowl, and outside the same, is secured a heating element 73 which may or may not be an enclosed element. A thermostat 74 is also secured on the outside of the bowl 71. This thermostat extends to a point adjacent to the mouth 72 and extends downwardly therefrom in alignment therewith, and in its normal position conforms somewhat to the shape of the bowl 71 as indicated in Fig. 3. In this embodiment, the thermostat 74 controls a pair of contact members 75, one of which is carried by the thermostat and the other of which may be mounted upon the bowl 71.

A rod 77 extends upwardly through a central tubular guide 78, which rod and guide correspond to the rod 43 and tubular guide 44 of Fig. 1. At its lower end, the rod 77 engages an arm 79 carrying one of a pair of switch contacts 81, the other contact being carried by arm 82. It is intended that switch contacts 81 should be closed by the closing of the cover as described about in connection with Fig. 1, except that in this instance when the rod 77 is pressed down, the contacts 81 are thereby brought directly into engagement with each other and held closed until the cover is released. There are, of course, numerous other ways to close the energizing switch when the cover is closed.

The electrical circuit for this embodiment is shown extending from one of the terminal pins 83 (corresponding to pins 64 of Fig. 1) through the thermostat contacts 75 to the heating element 73, and from the heating element 73 to one of the contacts 81. The other switch contact 81 is shown connected to one side of a signal lamp 84, the other side of which is connected to the opposite terminal pin 83. When current is applied to the terminal pins 83 the circuit is completed through the normally closed thermostat contacts to the heating element 73. However, the circuit is broken at the switch contacts 81 until the cover is closed, whereupon the circuit is instantly made through the contacts 81 and the heating element becomes energized. At the same time the signal lamp is lighted.

As soon as the water that is placed in the bowl 71 has evaporated, the bowl heats which in turn heats the thermostat 74 and moves it to open the switch contacts 75. This will break the circuit through the heating element 73 and also through the signal lamp 84 which, in this form of my invention, will indicate to the user that the cooking action is completed. The cover may then be opened, automatically or by hand, whereupon the circuit through the heating element also becomes broken at the contacts 81, and no matter if the thermostat contacts 75 are thereafter closed, the heating element does not become energized.

The purpose of providing the mouth 72 and locating the thermostat 74 directly in line therewith is that the water to be placed in the bowl 71 will be put into the bowl through the mouth 72. In doing this, the water must flow down over that portion of the bowl beneath which the thermostat is secured, and this will insure the cooling of the thermostat 74 to the point where the contacts 75 will be closed. This provision is not of so much importance in cooking a single batch of eggs, but when cooking successive batches, it is desirable to insure a prompt and sufficient cooling of the thermostat 74 so that the mechanism will be in readiness to cook each successive batch without delay.

Fig. 4 shows a still further modified arrangement for opening the control switch wherein the thermostat does this directly. In this embodiment, the bowl 91 is provided with a ring-shaped cavity 92 in which is mounted a heating element 93, a plate 94 closing the bottom of the cavity. The movements of a rod 95 corresponding to rod 77 of Fig. 3 operate a pair of switch contacts 96. The rod 95 may be moved in any desired manner to close the switch when it is desired to begin the cooking action, and closure of the switch 95 energizes the heating element 93. A thermostat 97, which consists of a strip of bi-metal, is located on the interior of the ring-shaped cavity 92. The rod 95 has a collar 98 thereon in contact with thermostat 97. Normally, when the contacts 96 are not engaged, the thermostat strip 97 lies loose inside the ring-shaped cavity. When rod 95 is pressed down to close the contacts the thermostat strip is spread. This bowing of the thermostat when heated will eventually lift the rod far enough to open the switch contacts 96, thus breaking the circuit to the heating element 93. It will be understood that this showing is by way of illustration only of the principle of opening the switch 96 directly by the operation of the thermostat. This same movement can also be used to directly trip a latch for the cover, but in view of the foregoing descriptions it is thought unnecessary to set out such mechanism in detail.

It is apparent that any arrangement may be introduced for the timing of the cooking operation. It so happens that in the egg cooker as designed, a certain quantity of water is evaporated per minute which will give the desired time control. If a predetermined cooking time were desired in waffle irons, for example, a clock escapement mechanism could be introduced. However, the other features of my invention are applicable to waffle irons and other appliances, where after a predetermined temperature has been reached, the thermostat will release a catch holding two halves together and a spring will separate the two halves, and/or automatically open the switch to the heating element, all as described above in connection with the egg cooker to stop the cooking action and give a visual indication of the finish of that action.

Other modifications may be made in the arrangement and location of parts within the spirit and scope of my invention and such modifications are intended to be covered by the appended claims.

I claim:

1. A cooking appliance comprising a bowl, a cover hingedly connected to said bowl, a heating element for said bowl, a switch therefor, a rod extending toward said cover, a guide therefor, and a food carrier having means engaging said rod when the carrier is positioned in said bowl and which is engaged by the cover when closed to press the rod to actuate the switch.

2. A cooking appliance comprising a bowl, a cover hingedly connected to said bowl, a heating element for said bowl, a switch therefor, a rod extending through said bowl, a guide therefor, a food carrier having a handle, and a spring-pressed rod therein which engages the first mentioned rod and which extends into position to be moved by said cover when the cover is closed.

3. A cooking appliance comprising a bowl, a cover hingedly connected to said bowl, a heating element for said bowl, a switch therefor, a rod extending toward said cover, a guide therefor, a second rod engaged by the cover and moved thereby to cause the first mentioned rod to actuate said switch, and thermostatic means for automatically opening said cover.

4. A cooking appliance comprising a bowl, a cover hingedly connected to said bowl, a heating element for said bowl, a switch therefor, a rod extending through said bowl, a guide therefor, a food carrier having a handle, a spring-pressed rod therein which engages the first mentioned rod and which extends into position to be moved by said cover when the cover is closed, and thermostatic means for automatically opening said cover.

5. A cooking appliance comprising a bowl, a cover hingedly connected to said bowl, a spring tending to open said cover, a releasable catch for holding the cover in closed position, a heating element in said bowl, a switch therefor, and a thermostat adapted to release said catch.

6. A cooking appliance comprising a bowl, a cover hingedly connected to said bowl, a spring tending to open said cover, a heating element for said bowl, a switch therefor, a thermostat having one end secured over said heating element and the opposite end free to move, and means engaged by said thermostat for releasing said cover.

7. An egg cooker comprising a bowl, a base upon which it is mounted, a cover for said bowl, a heating element, a switch therefor, an egg carrier comprising an apertured plate, a handle therefor, a spring-pressed rod mounted in said handle, said rod being moved by the positioning of the cover to close said bowl to actuate said switch.

8. An egg cooker comprising a base, a bowl mounted thereon, a cover therefor having a releasable catch, a heating element in the bottom of said bowl, a thermostat having one end extending into the bottom of said bowl and adapted to release said cover when the heating element has evaporated a quantity of water deposited in the bottom of said bowl about said element and thermostat.

9. A cooking appliance comprising separable upper and lower elements, electrical heating means therefor, a switch controlling the same, means controlled by the position of one of the elements to control the operation of the switch, and thermo-responsive means for automatically separating said elements after a predetermined time interval.

10. A cooking appliance comprising separable upper and lower elements, electrical heating means therefor, a switch controlling the same, means controlled by the position of one of the elements to control the operation of the switch, and thermo-responsive means for automatically separating said elements after a predetermined temperature has been reached.

11. An egg cooker comprising a bowl, an enclosed heating element mounted inside said bowl, a thermostat controlling the energization of said heating element and mounted inside said bowl and having a heat receiving portion extending adjacent and parallel to said heating element, and a pair of contacts controlled by the operation of said thermostat.

12. A cooking appliance comprising a bowl adapted to receive a quantity of water, a cover and a heating element therefor, and a thermostatic control for opening said cover and de-energizing said heating element, the thermostat being positioned so as to be cooled by the water deposited in the vessel.

13. A cooking appliance comprising a bowl, a cover hingedly connected to said bowl, a spring tending to open said cover, a heating element for said bowl, a switch therefor, a thermostat having one end secured adjacent said heating element to be affected by heat therefrom and its opposite end free to move and means engaged by said thermostat for releasing said cover.

14. A cooker comprising a base, a bowl mounted thereon, a cover therefor having a releasable catch, a heating element in the bottom of said bowl and a thermostat affectable by heat radiated from said heating element and adapted to release said cover after the heating element has evaporated a quantity of water deposited in the bottom of said bowl about said element.

15. A cooking appliance comprising a bowl, a cover hingedly connected to said bowl, a heating element for said bowl, a switch therefor, a hand lever for closing said switch independent of the closing of said cover, and means controlled by the closing of said cover to retain said switch closed only after said cover is closed.

16. A cooking appliance comprising a bowl, a cover hingedly connected to said bowl, a heating element for said bowl, a normally open switch therefor, a hand lever for closing said switch, said cover when closed, being operable to prevent opening of said switch and a thermostat for releasing said cover after a predetermined time.

17. A cooking appliance comprising a bowl, a cover hingedly connected to said bowl, a heating element for said bowl, a switch, operated by the closing of said cover to close said switch and thereby establish a circuit through said heating element, and thermostatic means responsive to heat of said heating element for automatically opening said cover after a predetermined time.

18. A cooking appliance comprising a bowl, a cover hingedly connected to said bowl, a heating element for said bowl, a switch for said element, means operated by the closing of said cover to close said switch, and thermostatic means for automatically opening said cover.

19. A cooking appliance comprising a bowl, a cover hingedly connected to said bowl, a heating element for said bowl, a switch therefor, and thermo-responsive means for automatically opening and thereby ventilating the closed cover and bowl after a predetermined time.

20. A cooking appliance comprising a bowl, a cover hingedly connected to said bowl, a spring tending to open said cover, a heating element for said bowl, a switch for said heating element, a latch for holding said cover and said switch closed against the tendency of said spring, and a thermostat for automatically releasing said latch and thereby said cover and simultaneously therewith opening said switch.

21. A cooking appliance comprising a bowl adapted to receive a quantity of water, a heating element for the bowl, a thermostatic control therefor responsive to heat of said heating element and adjusted to become effective only when there is no water in said bowl, the thermostat being located so as to be cooled by water introduced into the bowl.

22. A cooking appliance comprising a bowl, a heating element therefor, a switch for said element including a projecting rod and a thermostat, secured at its ends and engaging said rod intermediate said ends, responsive to heat of said heating element whereby to move said rod to operate said switch, said theremostat being adjusted to become effective to move said rod only when there is no more water in said bowl.

JOHN E. SMITH.